US012131701B2

(12) United States Patent
Li et al.

(10) Patent No.: US 12,131,701 B2
(45) Date of Patent: Oct. 29, 2024

(54) DISPLAY PANEL, INTEGRATED CHIP AND DISPLAY APPARATUS

(71) Applicant: Xiamen Tianma Display Technology Co., Ltd., Xiamen (CN)

(72) Inventors: Jieliang Li, Xiamen (CN); Ping An, Xiamen (CN); Guoxing Chen, Xiamen (CN); Yuping Xu, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/102,780

(22) Filed: Jan. 30, 2023

(65) Prior Publication Data

US 2023/0377517 A1 Nov. 23, 2023

(30) Foreign Application Priority Data

May 18, 2022 (CN) ......................... 202210538712.3

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2320/0247* (2013.01); *G09G 2330/021* (2013.01)

(58) Field of Classification Search
CPC ................... G09G 3/3233; G09G 3/32; G09G 2320/0247; G09G 2330/021
See application file for complete search history.

(56) References Cited

U.S. PATENT DOCUMENTS 11,200,399 B1 * 12/2021 Yang .................. G06V 40/1318
2002/0011976 A1 * 1/2002 Hashimoto .......... G09G 3/3233 345/76
2018/0366068 A1 * 12/2018 Liu ...................... G06V 40/171
(Continued)

FOREIGN PATENT DOCUMENTS

CN 114256322 A 3/2022
CN 114420032 A 4/2022
WO 2021147032 A1 7/2021

OTHER PUBLICATIONS

The First Office Action for CN application No. 202210538712.3, dated Jul. 5, 2024, 21 pages.

*Primary Examiner* — Stacy Khoo
(74) *Attorney, Agent, or Firm* — East IP P.C.

(57) ABSTRACT

The present application discloses a display panel, an integrated chip and a display apparatus. The display panel includes: a first display area and a second display area; and pixel circuits including first pixel circuits and second pixel circuits, wherein the first pixel circuits are configured to provide driving currents to light emitting elements of the first display area, and the second pixel circuits are configured to provide driving currents to light emitting elements of the second display area, the pixel circuits receive a bias adjustment signal, the bias adjustment signal includes a first bias adjustment signal and a second bias adjustment signal, the first pixel circuits receive the first bias adjustment signal, and the second pixel circuits receive the second bias adjustment signals, a voltage value of the first bias adjustment signal is V1, and a voltage value of the second bias adjustment signal is V2, wherein V1≠V2.

18 Claims, 9 Drawing Sheets

(56) References Cited

U.S. PATENT DOCUMENTS

| | | | |
|---|---|---|---|
| 2020/0227488 A1 | 7/2020 | Xin et al. | |
| 2022/0036808 A1 | 2/2022 | Wu et al. | |
| 2022/0148506 A1 * | 5/2022 | Yuan .................... | G09G 3/3233 |
| 2022/0165806 A1 * | 5/2022 | Yun .................... | H10K 59/1216 |

* cited by examiner

DISPLAY PANEL, INTEGRATED CHIP AND DISPLAY APPARATUS

CROSS REFERENCE TO RELATED APPLICATION

This application claims priority to Chinese Patent Application No. 202210538712.3, filed on May 18, 2022, which is hereby incorporated by reference in its entirety.

TECHNICAL FIELD

The present application relates to a field of display technology, and particularly to a display panel, an integrated chip for providing a signal to the display panel, and a display apparatus including the display panel.

BACKGROUND

With the development of display technology, the organic light emitting diode (OLED) display panel and the micro light emitting diode (micro LED) display panel and other new display panels emerge in an endless stream, and are widely favored by consumers. In addition, as the functions integrated on the display panel become more and more complete, different areas of the display panel may be required to have different functions. In order to realize the different functions, it may be necessary to carry out differentiated designs for different areas of the display panel.

The pixel circuits are very critical components in the display panel, which play an important role in providing driving currents to the light emitting elements of the display panel. When different areas of the display panel are required for different display functions or display effects, it is often necessary to carry out differentiated designs for different areas of the display panel. Therefore, how to carry out the differential designs for pixel circuits according to the display functions or display effects of the different areas in the display panel is a research hotspot at the current stage of the field.

SUMMARY

In view of this, the present application provides a display panel, an integrated chip for providing a signal to the display panel, and a display apparatus including the display panel.

One aspect of the present application provides a display panel including: a first display area and a second display area; and pixel circuits including first pixel circuits and second pixel circuits, wherein the first pixel circuits are configured to provide driving currents to light emitting elements of the first display area, and the second pixel circuits are configured to provide driving currents to light emitting elements of the second display area, wherein the pixel circuits receive a bias adjustment signal, the bias adjustment signal includes a first bias adjustment signal and a second bias adjustment signal, and the first pixel circuits receive the first bias adjustment signal to adjust bias states of the first pixel circuits, and the second pixel circuits receive the second bias adjustment signals to adjust bias states of the second pixel circuits, and wherein a voltage value of the first bias adjustment signal is V1, and a voltage value of the second bias adjustment signal is V2, and wherein V1≠V2.

Another aspect of the present application provides an integrated chip for providing the bias adjustment signal to the display panel described above, wherein the integrated chip provides the first bias adjustment signal to the first pixel circuits to adjust the bias states of the first pixel circuits, and the integrated chip provides the second bias adjustment signal to the second pixel circuits to adjust the bias states of the second pixel circuits, and wherein the voltage value of the first bias adjustment signal is V1, and the voltage value of the second bias adjustment signal is V2, and wherein V1≠V2.

Yet another aspect of the present application provides a display apparatus including the display panel described above.

DETAILED DESCRIPTION

In order to make the above objects, features and advantages of the present invention more obvious and easy to understand, the present application will be further described below with reference to the accompanying drawings and embodiments.

It should be noted that specific details are set forth in the following description in order to facilitate a thorough understanding of the present application. However, the present application may be implemented in many other ways different from those described herein, and those skilled in the art may make similar promotions without departing from the connotation of the present application. Thus, the present application is not limited by the specific embodiments disclosed below.

An aspect of the present application provides a display panel. The display panel may be an organic light emitting diode display panel, a micro light emitting diode display panel, or other types of display panels.

Figure 1:
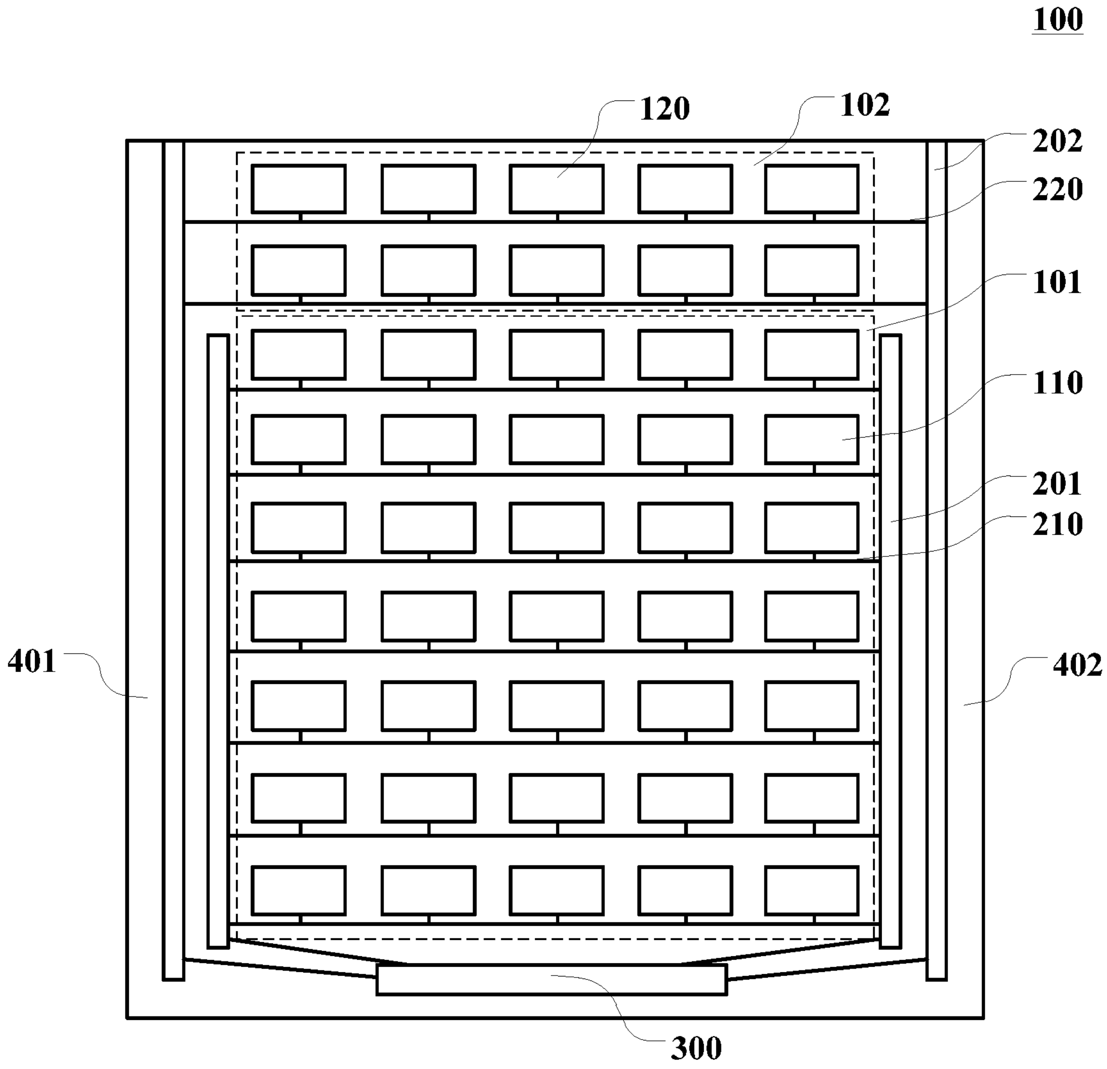
FIG. 1 is a schematic diagram of a display panel provided by an embodiment of the present application.

Referring to FIG. 1, FIG. 1 is a schematic diagram of a display panel provided by an embodiment of the present application, wherein the display panel 10 includes a first display area 101 and a second display area 102, and pixel circuits including first pixel circuits 110 and second pixel circuits 120. The first pixel circuits 110 are configured to provide driving currents to light emitting elements of the first display area 101, and the second pixel circuits 120 are configured to provide driving currents to light emitting elements of the second display area 102. The pixel circuits receive a bias adjustment signal, the bias adjustment signal includes a first bias adjustment signal and a second bias adjustment signal. The first pixel circuits 110 receive the first bias adjustment signal to adjust bias states of the first pixel circuits 110, and the second pixel circuits 120 receive the second bias adjustment signals to adjust bias states of the second pixel circuits 120. A voltage value of the first bias adjustment signal is V1, and a voltage value of the second bias adjustment signal is V2, and wherein V1≠V2.

Through the above design, the display panel 10 includes the first display area 101 and the second display area 102, the first pixel circuits 110 for providing driving currents to the light emitting elements in the first display area 101 receive the first bias adjustment signal, the second pixel circuits 120 for providing driving currents to the light emitting elements in the second display area 102 receive the second bias adjustment signal, and the voltage value of the first bias adjustment signal is different from the voltage value of the second bias adjustment signal. Since the bias adjustment signal is a signal received by a pixel circuit for adjusting a bias state of a driving transistor, a magnitude of the bias adjustment signal affects the adjustment process of the bias state of the driving transistor. Under a condition that the requirements for the pixel circuits in the first display area 101 and the second display area 102 in the panel are different, in order to achieve different functions, which results in bias states of the driving transistors different, different bias adjustment signals are required to adjust the bias states of the driving transistors of the pixel circuits corresponding to the first display area 101 and the second display area 102 respectively, thereby benefiting for optimizing the respective functions of the different display areas.

It should be noted that, as shown in FIG. 1, the first bias adjustment signal may be provided by first bias adjustment signal lines 210, the second bias adjustment signal may be provided by second bias adjustment signal lines 220. The first bias adjustment signal bus 201 is configured to provide signals to the first bias adjustment signal lines 210, the second bias adjustment signal bus 202 is configured to provide signals to the second bias adjustment signal lines 220, and the integrated chip 300 may be configured to provide signals to the first bias adjustment signal bus 201 and the second bias adjustment signal bus 202. The settings of the integrated chip and each signal line will be described in detail below.

Figure 2:
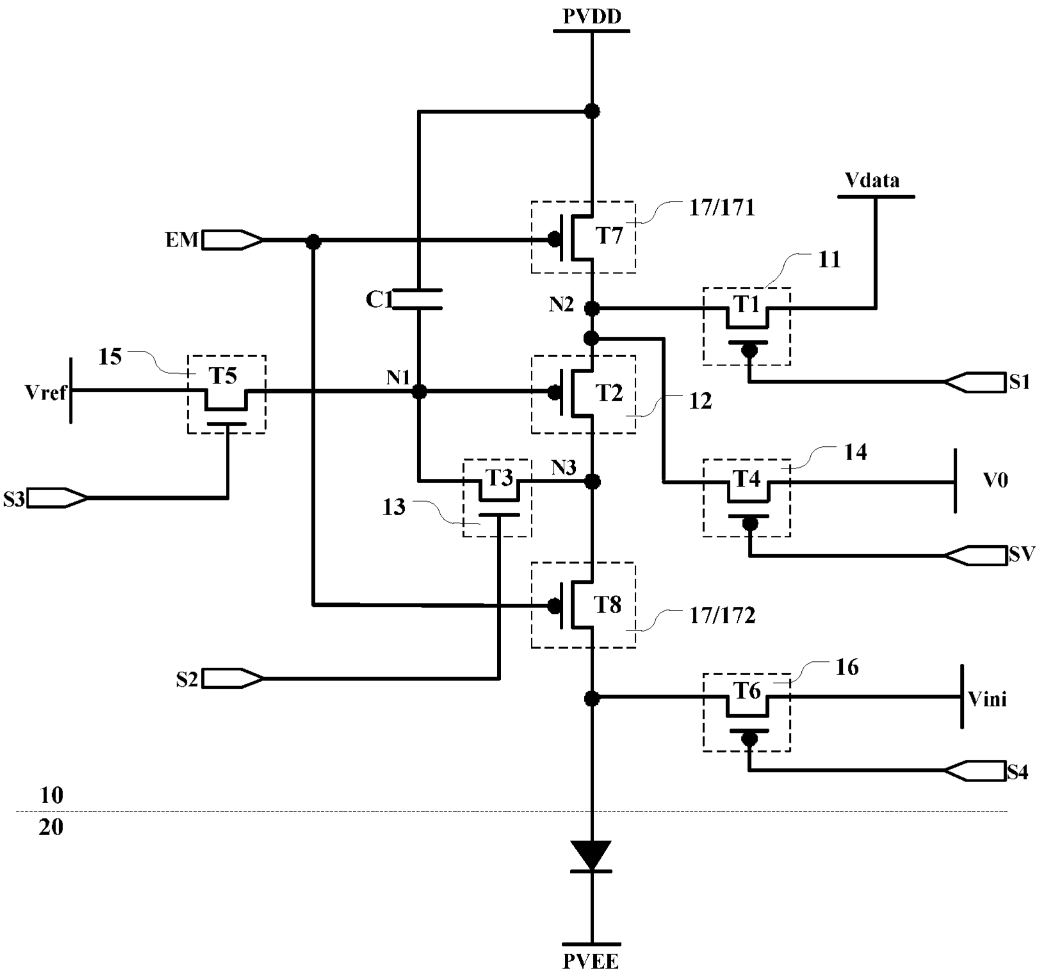
FIG. 2 is a schematic diagram of a pixel circuit provided by an embodiment of the present application.
Figure 3:
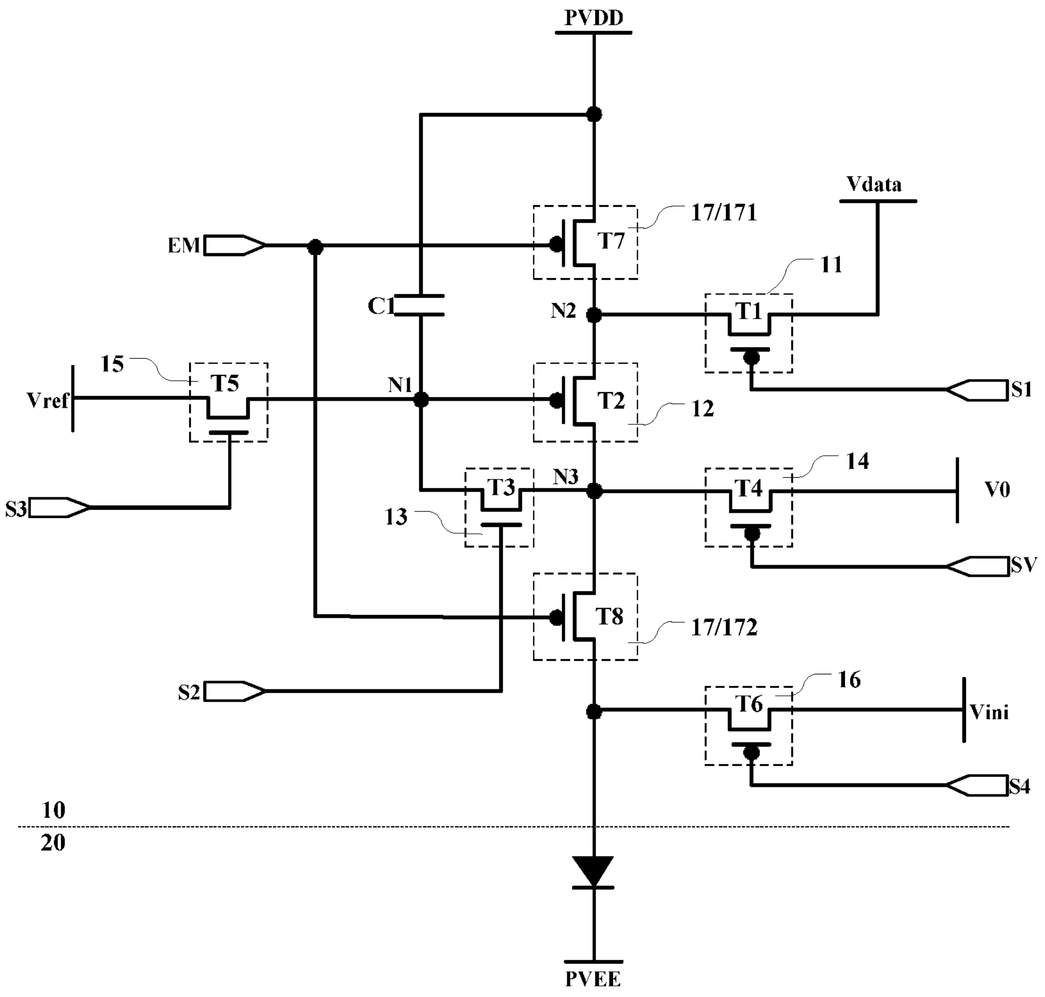
FIG. 3 is a schematic diagram of another pixel circuit provided by an embodiment of the present application.
Figure 4:
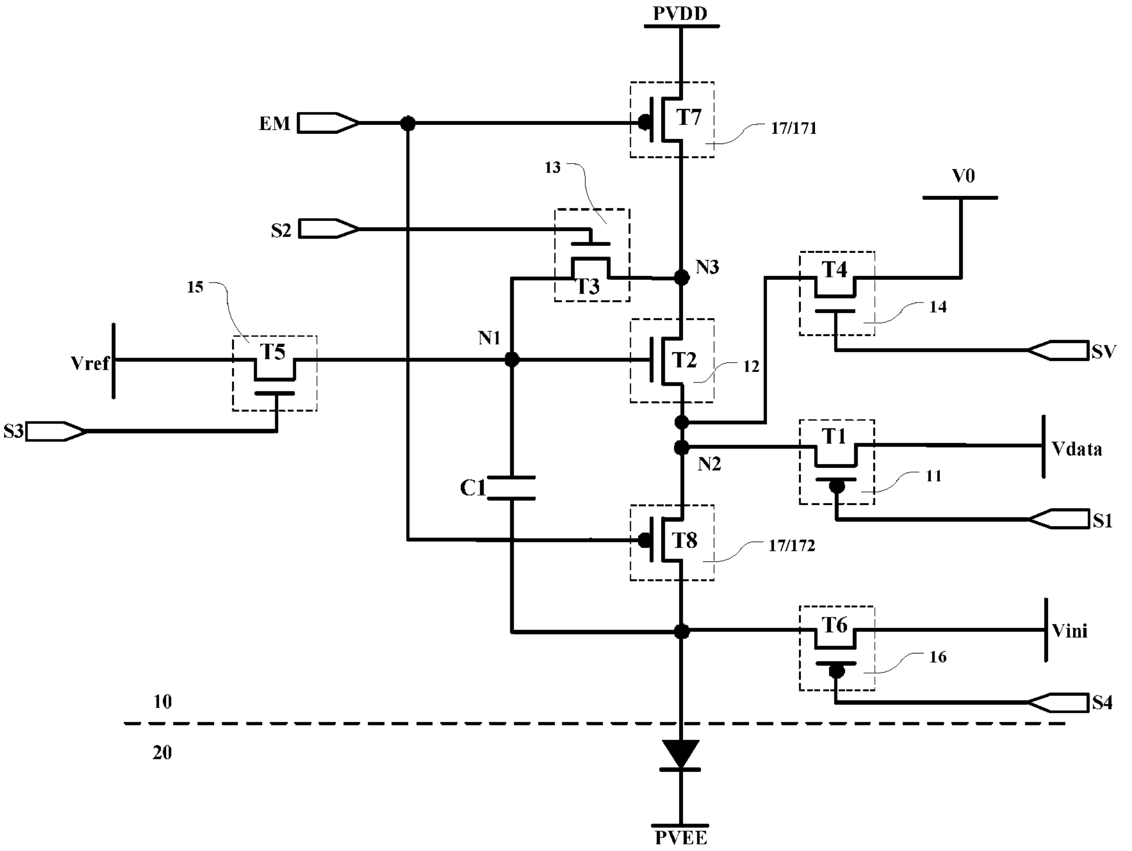
FIG. 4 is a schematic diagram of yet another pixel circuit provided by an embodiment of the present application.
Figure 5:
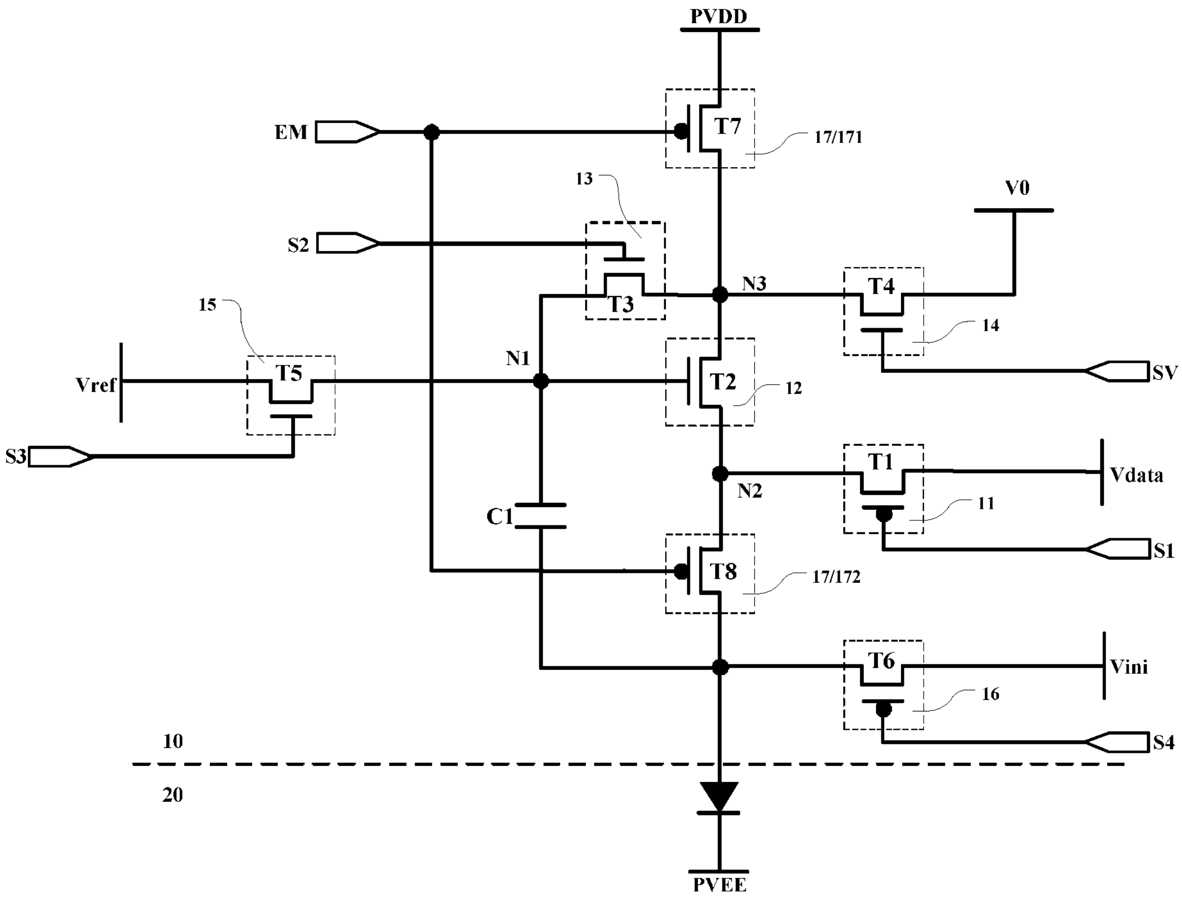
FIG. 5 is a schematic diagram of still another pixel circuit provided by an embodiment of the present application.

Optionally, referring to FIG. 2 to FIG. 5, FIG. 2 is a schematic diagram of a pixel circuit provided by an embodiment of the present application, FIG. 3 is a schematic diagram of another pixel circuit provided by an embodiment of the present application, FIG. 4 is a schematic diagram of yet another pixel circuit provided by an embodiment of the present application, and FIG. 5 is a schematic diagram of still another pixel circuit provided by an embodiment of the present application. A pixel circuit 10 includes a data writing module 11, a driving module 12, a compensation module 13 and a bias adjustment module 14. The driving module 12 includes a driving transistor T2 configured to provide a driving current to a light emitting element 20 of the display panel 100; the data writing module 11 is connected to a first electrode (i.e., a N2 node) of the driving transistor T2, and is configured to provide a data signal to the driving transistor T2; the bias adjustment module 14 is connected to the first electrode (i.e., the N2 node) or a second electrode (i.e., a N3 node) of the driving transistor T2, and is configured to provide the bias adjustment signal V0 to the driving transistor; the compensation module 13 is connected between a gate (i.e., a N1 node) and the second electrode (i.e., the N3 node) of the driving transistor, and is configured to compensate a threshold voltage of the driving transistor T2.

In addition, the pixel circuit 10 may further include a reset module 15 for providing a reset signal Vref to the gate of the driving transistor T2; an initialization module 16 for providing an initialization signal Vini to the light emitting element 20; a light emitting control module 17 for selectively allowing the light emitting element 20 to turn into the light emitting stage. Optionally, the light emitting control module 17 includes a first light emitting control module 171 and a second light emitting control module 172. The first light emitting control module 171 is connected between a first power signal terminal and an electrode of the driving transistor T2, and the second light emitting control module 172 is connected between another electrode of the driving transistor T2 and the light emitting element 20.

Optionally, in this embodiment, a control terminal of the data writing module 11 receives a first scanning signal S1, and the first scanning signal S1 controls the data writing module 11 to be turned on and off. A control terminal of the compensation module 13 receives a second scanning signal S2, and the second scanning signal S2 controls the compensation module 13 to be turned on and off. A control terminal of the bias adjustment module 14 receives a bias adjustment control signal SV, and the bias adjustment control signal SV controls the bias adjustment module 14 to be turned on and off. A control terminal of the reset module 15 receives a third scanning signal S3, and the third scanning signal S3 controls the reset module 15 to be turned on and off. A control terminal of the initialization module 16 receives a fourth scanning signal S4, and the fourth scanning signal S4 controls the initialization module 16 to be turned on and off. A control terminal of the light emitting control module 17 receives a light emitting control signal EM, and the light emitting control signal EM controls the light emitting control module 17 to be turned on and off.

In addition, optionally, in this embodiment, the data writing module 11 includes a data writing transistor T1, and the first scanning signal S1 controls the data writing transistor T1 to be turned on and off. The compensation module 13 includes a compensation transistor T3, and the second scanning signal S2 controls the compensation transistor T3 to be turned on and off. The bias adjustment module 14 includes a bias adjustment transistor T4, and the bias adjustment control signal SV controls the bias adjustment transistor T4 to be turned on and off. The reset module 15 includes a reset transistor T5, and the third scanning signal S3 controls the reset transistor T5 to be turned on and off. The initialization module 16 includes an initialization transistor T6, and the fourth scanning signal S4 controls the initialization transistor T6 to be turned on and off. The first lighting control module 171 includes a first lighting control transistor T7, the second lighting control module 172 includes a second lighting control transistor T8, and the light emitting control signal EM controls the first lighting control transistor T7 and the second lighting control transistor T8 to be turned on and off.

It should be noted that at least two of the first scanning signal S1, the second scanning signal S2, the third scanning signal S3, the fourth scanning signal S4, the bias adjustment control signal SV, the light emitting control signal EM and other signals are the same, when conditions permit. For example, when the bias adjustment transistor T4 and the initialization transistor T6 are transistors of the same type, the bias adjustment control signal SV and the fourth scanning signal S4 may be the same signal.

It should be noted that, as shown in FIG. 2 and FIG. 3, the driving transistor T2 is a PMOS transistor, and the pixel circuit 10 further includes a storage capacitor C1. A first electrode of the storage capacitor C1 is connected to the first power signal terminal, its second electrode is connected to the gate of the driving transistor T2, and it is configured to store the signal transmitted to the gate of the driving transistor T2. As shown in FIG. 2, the bias adjustment module 14 is connected to the first electrode of the driving transistor T2, i.e., the N2 node, and as shown in FIG. 3, the bias adjustment module 14 is connected to the second electrode of the driving transistor T2, i.e., the N3 node. As shown in FIG. 4 and FIG. 5, the driving transistor T2 is a NMOS transistor, and the pixel circuit 10 further includes a storage capacitor C1. A first electrode of the storage capacitor C1 is connected to the light emitting element 20, its second electrode is connected to the gate of the driving transistor T2, and it is configured to store the signal transmitted to the gate of the driving transistor T2. As shown in FIG. 4, the bias adjustment module 14 is connected to the first electrode of the driving transistor T2, i.e., the N2 node. As shown in FIG. 5, the bias adjustment module 14 is connected to the second electrode of the driving transistor T2, i.e., N3 node.

By the above manner, a bias adjustment module 14 is provided in the pixel circuit 10, and the bias adjustment module 14 is configured to provide the bias adjustment signal V0 to the driving transistor T2. A bias problem may be occurred due to a potential difference between the gate and the first or second electrode of the driving transistor T2 during the light emitting process. That is, when the driving transistor T2 is a PMOS transistor, and when the driving transistor T2 is turned on and a voltage on its gate is greater than a voltage on its first or second electrode, the bias problem will be occurred; or when the driving transistor T2 is a NMOS transistor, and when the driving transistor T2 is turned on and a voltage of its gate is lower than a voltage on its first or second electrode, the bias problem will be occurred. The bias problem often causes a reverse electric field to be generated inside the driving transistor T2, resulting in carrier polarization, which results in an offset of a threshold voltage of the driving transistor T2. The offset of the threshold voltage of the driving transistor T2 results in an instable driving current generated by the driving transistor T2, especially when the gray scale is changing, flicker problem will occur. In this embodiment, by providing the bias adjustment signal V0 to the first electrode or the second electrode of the driving transistor T2 to adjust the voltage difference between the gate and the first or the second electrode of the driving transistor T2 in time, the bias problem is eliminated, the offset of the threshold voltage of the driving transistor T2 is avoid, and thus it is benefit to reduce the flicker phenomenon.

It should be noted that FIG. 2 to FIG. 5 only provide several schemes of setting the bias adjustment module 14 in the pixel circuit by way of examples, but do not include all setting schemes. Various other setting schemes for a bias adjustment module, which provides a bias adjustment signal to a pixel circuit for adjusting a bias state of the driving transistor and satisfies the definition of the bias adjustment signal in this embodiment, fall within the protection scope of the embodiments of the present application, which will not be repeated in this embodiment.

Optionally, in this embodiment, in some optional implementations, an operating process of the pixel circuit 10 includes a data writing frame and a holding frame, and the data writing frame includes a first bias adjustment stage. In the first bias adjustment stage, the voltage value of the first bias adjustment signal is V11, and the voltage value of the second bias adjustment signal is V12, wherein V11≠V12.

The data writing frame includes the data writing stage. In the data writing stage, the data writing module 11 and the compensation module 13 are turned on, and the data signal is written to the gate of the driving transistor T2. Generally, the holding frame does not include a data writing stage, and during the holding frame, the data signal is not written to the gate of the driving transistor T2. Thus, generally, a data signal refresh cycle of a pixel circuit includes one or several data writing frames and possibly a holding frame. Since data will be written to the gate of the driving transistor T2 in a data writing stage, which involves a change of a gray-scale signal, there is a high requirement for an ability of obtaining signals by the gate of the driving transistor T2, and in turn a high requirement for a stability of the driving transistor T2. Therefore, in the data writing frame, it is generally required to include a bias adjustment stage, to fully adjust a bias state in the driving transistor by the bias adjustment signal, to eliminate the offset phenomenon of the threshold voltage, so as to avoid the flicker problem during the change of the gray scale. Since there are different requirements for display functions on the first display area 101 and the second display area 102, in the first bias adjustment stage of the data writing frame, the voltage value of the first bias adjustment signal and the voltage value of the second bias adjustment signal may be selected as different from each other, so as to adjust the bias state of the first pixel circuit 110 and the bias state of the second pixel circuit 120 independently.

It should be noted that, in this implementation, it is forced on that the voltage value of the first bias adjustment signal and the voltage value of the second bias adjustment signal are different in the first bias adjustment stage of the data writing frame. Meanwhile, the holding frame may or may not include a bias adjustment stage. If the holding frame include a bias adjustment stage, in the bias adjustment stage of the holding frame, the voltage value of the first bias adjustment signal and the voltage value of the second bias adjustment signal may be the same or different.

Optionally, in this embodiment, in some other optional implementations, an operating process of the pixel circuit 10 includes a data writing frame and a holding frame, and the holding frame includes a second bias adjustment stage. In the second bias adjustment stage, the voltage value of the first bias adjustment signal is V21, and the voltage value of the second bias adjustment signal is V22, wherein V21≠V22.

As described above, in the holding frame, the data writing stage is not included, and thus the data signal is not written to the gate of the driving transistor T2. However, when the data refresh frequency of the display panel is low, that is, the number of the holding frames included in one data refresh cycle is large, the driving transistor will be in the holding stage for a long time, and the bias phenomenon therein will become more and more serious. If the bias adjustment stage is not provided in the holding frame, the offset problem of the threshold voltage of the driving transistor T2 will be more serious. In order to avoid this phenomenon, generally, a bias adjustment stag is also provided in the holding frame. Since there are different requirements for display functions on the first display area 101 and the second display area 102, in the second bias adjustment stage of the holding frame, the voltage value of the first bias adjustment signal and the voltage value of the second bias adjustment signal may be selected as different from each other, so as to adjust the bias state of the first pixel circuit 110 and the bias state of the second pixel circuit 120 independently.

It should be noted that, in this implementation, it is forced on that the voltage value of the first bias adjustment signal and the voltage value of the second bias adjustment signal are different in the second bias adjustment stage of the holding frame. Meanwhile, the data writing frame may or may not include a bias adjustment stage. If the data writing frame include a bias adjustment stage, in the bias adjustment stage of the data writing frame, the voltage value of the first bias adjustment signal and the voltage value of the second bias adjustment signal may be the same or different.

Optionally, in this embodiment, in some other optional implementations, an operating process of the pixel circuit 10 includes a data writing frame and a holding frame, the data writing frame includes a first bias adjustment stage, and the holding frame includes a second bias adjustment stage. In the first bias adjustment stage, the voltage value of the first bias adjustment signal is V11, and the voltage value of the second bias adjustment signal is V12. In the second bias adjustment stage, the voltage value of the first bias adjustment signal is V21, and the voltage value of the second bias adjustment signal is V22, wherein $|V11-V12|+|V21-V22|\neq 0$.

When each of the data writing frame and the holding frame includes a bias adjustment stage, since there are different requirements for display functions on the first display area 101 and the second display area 102, in at least one of the data writing frame and the holding frame, the first bias adjustment signal and the second bias adjustment signal may be set as different from each other, i.e., $|V11-V12|+|V21-V22|\neq 0$, so as to adjust the bias state of the first pixel circuit 110 and the bias state of the second pixel circuit 120 independently. Further, when $|V11-V12|+|V21-V22|\neq 0$, the following different situations may be included.

When $|V11-V12|=0$ and $|V21-V22|\neq 0$, that is, in the first bias adjustment stage of the data writing frame, the voltage value of the first bias adjustment signal and the voltage value of the second bias adjustment signal are the same; and in the second bias adjustment stage of the holding frame, the voltage value of the first bias adjustment signal and the voltage value of the second bias adjustment signal are different. Thus, the different requirements for display functions on the first display area 101 and the second display area 102 are satisfied mainly by adjusting the voltage values of the bias adjustment signals of the holding frame.

When $|V11-V12|\neq 0$ and $|V21-V22|=0$, that is, $V11\neq V12$ and $V21=V22$, and that is, in the first bias adjustment stage of the data writing frame, the voltage value of the first bias adjustment signal and the voltage value of the second bias adjustment signal are different; and in the second bias adjustment stage of the holding frame, the voltage value of the first bias adjustment signal and the voltage value of the second bias adjustment signal are the same. The different requirements for display functions on the first display area 101 and the second display area 102 are satisfied mainly by adjusting the voltage values of the bias adjustment signals of the data writing frame.

When $|V11-V12|\neq 0$ and $|V21-V22|\neq 0$, that is, $V11\neq V12$ and $V21\neq V22$, and that is, in the first bias adjustment stage of the data writing frame, the voltage value of the first bias adjustment signal and the voltage value of the second bias adjustment signal are different; and in the second bias adjustment stage of the holding frame, the voltage value of the first bias adjustment signal and the voltage value of the second bias adjustment signal are different. The different requirements for display functions on the first display area 101 and the second display area 102 are satisfied by adjusting the voltage values of the bias adjustment signals of the data writing frame and the holding frame. In this case, it may be $|V11-V12|=|V21-V22|$ or $|V11-V12|\neq|V21-V22|$, that is, $|V11-V12|<V21-V22|$ or $|V11-V12|>|V21-V22|$. When $|V11-V12|=|V21-V22|$, a change amount of voltage value between the bias adjustment signal in the first display area 101 and the bias adjustment signal in the second display area 102 in the first bias adjustment stage of the data writing frame is equal to a change amount of voltage value between the bias adjustment signal in the first display area 101 and the bias adjustment signal in the second display area 102 in the second bias adjustment stage of the holding frame, that is, a change amplitude on the bias adjustment signals in the data writing frame and a change amplitude on the bias adjustment signals in the holding frame are the same, which is beneficial to reduce a complexity of the signal adjustment. In some implementations, $|V11-V12|<|V21-V22|$, in this case, a change amplitude on the bias adjustment signals in the data writing frame is smaller than a change amplitude on the bias adjustment signals in the holding frame. When the display panel has a low data refresh frequency, the holding frame will be hold for a long time, in this case, the bias adjustment stage in the holding frame plays an important role in adjusting the bias state of the driving transistor. In this case, the change amplitude on the bias adjustment signals in the holding frame is set to be larger, to satisfy the respective requirements for display functions on the first display area 101 and the second display area 102 mainly by the change of the bias adjustment signals in the holding frame. In other implementations, $|V11-V12|>|V21-V22|$, in this case, a change amplitude on the bias adjustment signals in the data writing frame is larger than a change amplitude on the bias adjustment signals in the holding frame. When the display panel has a low data refresh frequency, there are fewer holding frames and more data writing frames. In this case, the change amplitude on the bias adjustment signals in the data writing frame is set to be larger, to satisfy the respective requirements for display functions on the first display area 101 and the second display area 102 mainly by the change of the bias adjustment signals in the data writing frame.

Optionally, in some implementations, $(V11-V12)\times(V21-V22)>0$, that is, $V11>V12$ and $V21>V22$, or $V11<V12$ and $V21<V22$, and that is, a change tendency on bias adjustment signals in the data writing frame is the same as a change tendency on bias adjustment signals in the holding frame. When the bias adjustment signals in the data writing frame become smaller, the bias adjustment signals in the holding frame also become smaller; or when the bias adjustment signals in the data writing frame become larger, the bias adjustment signals in the holding frame also become larger. Generally, under a condition that the requirements for the display functions on the first display area 101 and the second display area 102 are determined, the requirements for adjusting the bias states of the pixel circuits therein are determined, and then the change tendency on bias adjustment signals in the holding frame may be set equally to the setting of the change tendency on bias adjustment signals in the data writing frame.

Optionally, in other implementations, $(V11-V12)\times(V21-V22)<0$, that is, $V11>V12$ and $V21<V22$, or $V11<V12$ and $V21>V22$, it means that, in some special cases, there is also a situation that the change tendency on bias adjustment signals in the data writing frame is opposite to the change tendency on bias adjustment signals in the holding frame. These may be flexibly adjusted based on specific display requirements.

Optionally, in this embodiment, each first pixel circuit providing a driving current to a light emitting element of which an output light color is a first color, among the first pixel circuits 110, includes a first driving transistor; and each second pixel circuit providing a driving current to a light emitting element of which an output light color is the first color, among the second pixel circuits 120, includes a second driving transistor. A width-to-length ratio of a channel area of the first driving transistor is R11, and a width-to-length ratio of a channel area of the second driving transistor is R12, wherein R11≠R12.

In some implementations of this embodiment, the width-to-length ratios of the driving transistors in the first pixel circuit 110 and the second pixel circuit 120 are set to be different, so as to realize different requirements for the display functions on the first display area 101 and the second display area 102. Generally, the larger the width-to-length ratio of a driving transistor is, the larger the driving capability of the driving transistor is. Under a condition that other conditions are the same, the driving transistor with a larger width-to-length ratio may provide a larger driving current, which is beneficial for driving light emitting elements with a high light emitting brightness requirement or a large light emitting area requirement. When the first display area 101 and the second display area 102 have different requirements for the light emitting brightness and light emitting area of the light emitting element, it is usually necessary to set driving transistors with different width-to-length ratios, to satisfy the different requirements for display functions on the first display area 101 and the second display area 102.

Since the bias adjustment signals are set to adjust the bias states of the driving transistors, and when width-to-length ratios of the driving transistors are different and other conditions are the same, the bias states themselves are different, different bias adjustment signals are required, to specifically adjust the bias states of the driving transistors with different width-to-length ratios. Therefore, when R11≠R12, V1≠V2 may be set.

Optionally, in some implementations, it may be set that R11<R12 and V1>V2. That is, the voltage value of the bias adjustment signal received by the pixel circuit with a smaller width-to-length ratio of the driving transistor is greater than the voltage value of the bias adjustment signal received by the pixel circuit with a larger width-to-length ratio of the driving transistor. Since when the width-to-length ratio of the driving transistor is small, the driving transistor is generally used for providing driving current to the light emitting element that requires small driving current, in this case, the data signal received by the gate of the driving transistor is relatively large. Take the driving transistor being a PMOS transistor as an example, when the driving transistor is in the light emitting stage, the higher the potential of its gate, the more likely it is to form a reverse electric field with either the source or the drain, resulting in a bias phenomenon. That is, in this case, the bias phenomenon may occur more easily and may be more serious. Therefore, a larger bias adjustment signal needs to be set to eliminate the bias phenomenon of the driving transistor in a short time. Therefore, when R11<R12, V1>V2 is set.

Optionally, in other implementations, it is set that R11<R12 and V1<V2. That is, the voltage value of the bias adjustment signal received by the pixel circuit with a smaller width-to-length ratio of the driving transistor is smaller than the voltage value of the bias adjustment signal received by the pixel circuit with a larger width-to-length ratio of the driving transistor. In some special cases, when the width-to-length ratio of the driving transistor is large, its bias degree is also large. For example, when a pixel circuit with a large width-to-length ratio of the driving transistor is used for providing a driving current to more than one light emitting elements, as there are many light emitting elements connected to it, the driving current is large, and there is a high requirement for the stability of the threshold voltage of the driving transistor. It is also possible to set the pixel circuit with a larger width-to-length ratio of the driving transistor to receive a larger bias adjustment signal. Thus, when R11<R12, V1<V2 is set.

Further optional, in this embodiment, R11/R12<V2/V1, that is, a ratio between the width-to-length ratios of the driving transistors is smaller than a ratio between V2 and V1. When R11<R12 and V1<V2, the above formula is also obviously satisfied, the reasons are as described above and will not be repeated here. When R11<R12 and V1>V2, it means that a change amplitude on the bias adjustment signals is smaller than a change amplitude on the width-to-length ratios of the driving transistors. As mentioned above, the change of the width-to-length ratio of the driving transistor affects the driving capability and the capability for generating driving current of the driving transistor. Generally, a small change of the width-to-length ratio of the driving transistor has little effect on the driving capability and the capability for generating driving current, while a large change of the width-to-length ratio will cause a significant change on the driving capability and the capability for generating driving current. The bias adjustment signal is to adjust the bias state of the driving transistor. In addition to that the bias state has a certain relationship with the width-to-length ratio of the driving transistor, a very important factor which affects the bias state is the data refresh frequency of the display panel. That is, the longer the driving transistor is hold in one data cycle, the more serious the bias is. Therefore, when the data refresh frequency is constant, the change amplitude on the bias state of the driving transistor caused by the width-to-length ratio of the driving transistor is relatively small. Therefore, in the present application, R11/R12<V2/V1 is set to avoid an increase in power consumption caused by a large change on the adjustment signal and reduce process difficulty.

In addition, optionally, in this embodiment, an operating process of a pixel circuit 10 includes a data writing frame and a holding frame, the data writing frame includes a first bias adjustment stage, and the holding frame includes a second bias adjustment stage. In the first bias adjustment stage, the voltage value of the bias adjustment signal is V11, and the voltage value of the second bias adjustment signal is V12. In the second bias adjustment stage, the voltage value of the first bias adjustment signal is V21, and the voltage value of the second bias adjustment signal is V22; wherein R11/R12<V12/V11, and/or R11/R12<V22/V21. When R11<R12 and V11<V12, and/or when R11<R12 and V21<V22, the above formulas are obviously satisfied, which will not be repeated herein. When R11<R12 and V11>V12, and/or when R11<R12 and V21>V22, these situations are similar to those in the previous paragraphs. Since the change amplitude on the bias state of the driving transistor caused by the change on the width-to-length ratio of the driving transistor is relatively small, in order to avoid increasing power consumption and process difficulty, the change amplitude on the bias adjustment signals in the data writing frame is defined to be smaller than the change amplitude on the width-to-length ratios of the driving transistor, and/or, the change amplitude on the bias adjustment signals in the holding frame is defined to be smaller than the change amplitude on the width-to-length ratios of the driving transistor, that is, R11/R12<V12/V11, and/or R11/R12<V22/V21.

Optionally, in this embodiment, when a first pixel circuit 110 and a second pixel circuit 120 receive a same data signal, a driving current generated by the first pixel circuit is I1, and a driving current generated by the second pixel circuit is I2, wherein I1≠I2.

When there are different requirements for the driving currents of the light emitting elements in the first display area 101 and the second display area 102, generally, the bias states of the driving transistors are different, as the capabilities for generate the driving currents are different. Therefore, when I1≠I2, V1≠V2, and the bias states of the driving transistors of the pixel circuits in the first display area 101 and the second display area 102 are adjusted differentially.

Optionally, in some implementations, I1<I2, and V1>V2, when the capability for generating driving current by the driving transistor is low, in some cases, the bias of the driving transistor is large, and then a large bias adjustment signal may be applied to adjust its bias state. In some other implementations, I1<I2 and V1<V2, when the capability for generating driving current by the driving transistor is low, in some cases, the bias of the driving transistor is small, and then a small bias adjustment signal may be applied to adjust its bias state. These may be flexibly adjusted according to the specific situation.

Optionally, in this embodiment, a distribution density of light emitting elements in at least a portion of the first display area 101 is ρ1, and a distribution density of light emitting elements in at least a portion of the second display area 102 is ρ2, wherein ρ1≠ρ2.

When the distribution densities of the light emitting elements in the first display area 101 and the second display area 102 are different, in order to ensure the uniformity of the display effect in each area of the display panel under the different distribution densities of the light emitting elements, there may be a difference on light emitting brightness of the light emitting elements at positions with different distribution densities. The difference on light emitting brightness causes different requirements for the capability for generating driving current by the driving transistor, and thus the bias degrees of the driving transistors may also be different. Therefore, when ρ1≠ρ2, V1≠V2, and the bias states of the driving transistors of the pixel circuits in the first display area 101 and the second display area 102 are adjusted differentially.

Optionally, in some implementations, ρ1<ρ2 and V1<V2, when the distribution density of the light emitting elements is large, in some cases, the bias degree of the driving transistor is large, and then a large bias adjustment signal may be applied to adjust its bias state. In some other implementations, ρ1<ρ2 and V1>V2, when the distribution density of the light emitting elements is large, in some cases, the bias degree of the driving transistor is small, and then a small bias adjustment signal may be applied to adjust its bias state. These may be flexibly adjusted according to the specific situation.

Optionally, in this embodiment, a light emitting area of a light emitting element of which an output light color is a first color in the first display area 101 is S11, and a light emitting area of a light emitting element of which an output light color is the first color in the second display area is S12, wherein S11<S12.

In this embodiment, the light emitting area of the light emitting element of the first display area 101 may be smaller than the light emitting area of the second display area 102. Optionally, as will be described later, the second display area 102 includes a transmission area, an operating process of the second display area includes a light transmission stage, and at least in the light transmission stage, the transmission area allows light to pass through the display panel. Since it is required for some space for arranging the transmission area in the second display area, the number of light-blocking structures such as pixel circuits needs to be as small as possible, and the reducing of the number of pixel circuits causes a reducing number of light emitting elements correspondingly. Therefore, the light emitting area of the light emitting element in the second display area 102 is set to be larger, so as to fully ensure the light emitting brightness and display effect of the second display area 102.

Optionally, in this embodiment, in the first display area 101, a first pixel circuit 110 provides a driving current to m1 light emitting elements; and in the second display area 102, a second pixel circuit 120 provides a driving current to m2 light emitting elements, wherein m1≥1, m2≥1, and m1<m2. That is, the number of light emitting elements driven by a second pixel circuit 120 is greater than the number of light emitting elements driven by a first pixel circuit 110.

In this embodiment, when the first display area 101 and the second display area 102 need to implement different functions, for example, when the second display area 102 includes a transmission area, the second pixel circuit 120 is set to drive a larger number of light emitting elements, in order to sufficiently reduce the number of pixel circuits in the second display area 102. Thereby, a large area of the transmission area may be ensured, while the display effect of the second display area 102 may be guaranteed. In this case, since the number of light emitting elements driven by a first pixel circuit 110 is different from the number of light emitting elements driven by a second pixel circuit 120, when the first display area 101 and the second display area 102 are required for uniform display brightness, a larger driving current is required for the second pixel circuit 120, which is to be distributed to a larger number of light emitting elements. Thereby, the first pixel circuit 110 and the second pixel circuit 120 have different capabilities for generating driving current and different bias degrees. Therefore, different bias adjustment signals are required for differential adjustments. That is, when m1<m2, V1≠V2.

Optionally, in some implementations, m1<m2 and V1<V2, as described above, the number of light emitting elements driven by a second pixel circuit 120 is larger, and the driving current generated by the second pixel circuit 120 is larger. In some cases, the larger driving current may lead to a larger bias degree of the driving transistor, so that a larger bias adjustment signal is required to adjust its bias state. Therefore, in this case, V1<V2. While in some other implementations, there may also be a situation that m1<m2 and V1>V2, especially when the larger driving current generated in the second pixel circuit 120 is realized due to a smaller data signal received by it. In this case, the data signal received by the second pixel circuit 120 is smaller, and the data signal received by the first pixel circuit 110 is larger, the driving transistor in the first pixel circuit 110 is more prone to have a bias problem, and the bias problems of it may be more serious. In this case, the respective bias states of the first pixel circuit 110 and the second pixel circuit 120 may be better adjusted by setting V1>V2.

In this embodiment, optionally, m1=1, and m2=2, m2=3 or m2=4. That is, in the first display area 101, a first pixel circuit 110 provides a driving current for one light emitting element; and in the second display area 102, a second pixel circuit 120 provides a driving current for 2, 3, or 4 light emitting elements. In the first display area 101, since there is no need to consider the problem of the transmission area, one pixel circuit drives one light emitting element, which is beneficial to fully ensure the driving capability of a pixel circuit for the light emitting element. In the second display area 102, since there is a need to consider the problem of the transmission area, one pixel circuit drives multiple light emitting elements. However, the inventor found through experiments that when one pixel circuit drives more than 4 light emitting elements, the requirement for the driving capability of the pixel circuit is relatively high, and the instability of the driving process increases, which is not benefit for ensuring the display effect of the display panel. Of course, in other implementations, when the problem of stability of the pixel circuit is sufficiently overcame, it is also possible that m1 is an integer greater than 1, and m2 is an integer greater than 4.

Optionally, in this embodiment, as shown in FIG. 1, the display panel 100 includes first bias adjustment signal lines 210 and a first bias adjustment signal bus 201, and second bias adjustment signal lines 220 and a second bias adjustment signal bus 202. The first bias adjustment signal lines 201 are connected between the first pixel circuits 110 and the first bias adjustment signal bus 201. The second bias adjustment signal lines 220 are connected between the second pixel circuits 120 and the second bias adjustment signal bus 202. The first bias adjustment signal bus 201 and the second bias adjustment signal bus 202 are located in at least one of a first side frame 401 and a second side frame 402 of the display panel that are arranged opposite to each other. In FIG. 1, the first bias adjustment signal bus 201 and the second bias adjustment signal bus 202 are arranged in both the first side frame 401 and the second side frame 402, to provide signals to the first bias adjustment signal lines 210 and the second bias adjustment signal lines 220 from both sides. In other implementations, the first bias adjustment signal bus 201 may be located in the first side frame 401, and the second bias adjustment signal bus 202 may be located in the second side frame 402; or the first bias adjustment signal bus 201 may be located in the second side frame 402, the second bias adjustment signal bus 202 may be located in the first side frame 401. In other implementations, both the first bias adjustment signal bus 201 and the second bias adjustment signal bus 202 may be located in the first side frame 401 or the second side frame 402. These may be flexibly adjusted according to the specific situation.

Optionally, in this embodiment, the first bias adjustment signal bus 210 and the second bias adjustment signal bus 202 are located in a same film layer, and the first bias adjustment signal lines 210 and the second bias adjustment signal lines 220 are located in different film layers; or the first bias adjustment signal bus 201 and the second bias adjustment signal bus 202 are located in different film layers, and the first bias adjustment signal lines 210 and the second bias adjustment signal lines 220 are located in a same film layer; or the first bias adjustment signal bus 201 and the second bias adjustment signal bus 202 are located in a same film layer, and the first bias adjustment signal lines 210 and the second bias adjustment signal lines 220 are located in a same film layer.

In this embodiment, the film layer relationship among the four kinds of signal lines, which are the first bias adjustment signal lines 210, the second bias adjustment signal lines 220, the first bias adjustment signal bus 201, and the second bias adjustment signal bus 202, may be designed flexibly according to actual requirements. When the first bias adjustment signal bus 201 and the second bias adjustment signal bus 202 are located in different film layers, they may at least partially overlap each other, thereby sufficiently saving the frame area.

Figure 6:
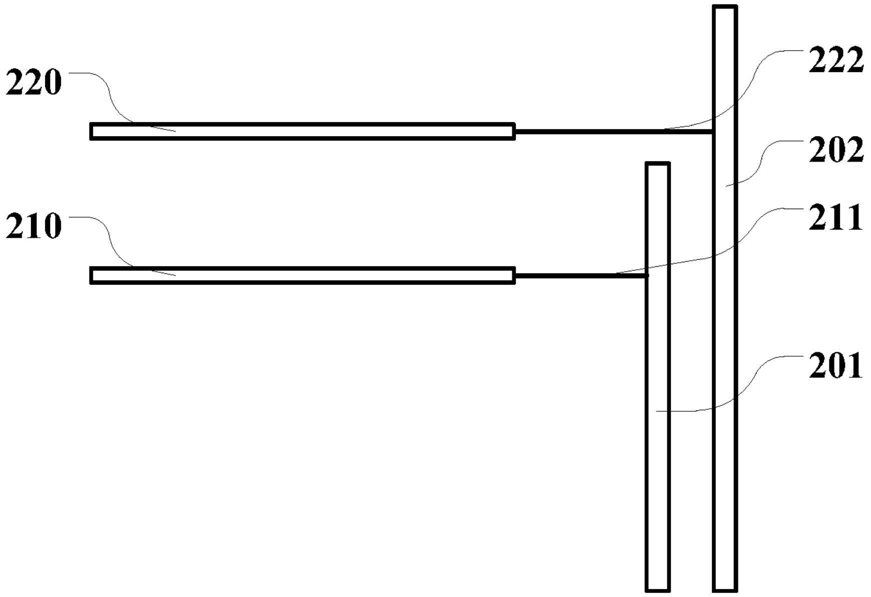
FIG. 6 is a schematic diagram of a line connection scheme provided by an embodiment of the present application.

Optionally, referring to FIG. 6, FIG. 6 is a schematic diagram of a line connection scheme provided by an embodiment of the present application, wherein the first bias adjustment signal bus 201 and the first bias adjustment signal lines 210 are connected by transition lines 211, and the transition lines 211 and at least one of the first bias adjustment signal bus 201 and the first bias adjustment signal lines 210 are located in different film layers; and/or the second bias adjustment signal bus 202 and the second bias adjustment signal lines 220 are connected by transition lines 222, and the transition lines 222 and at least one of the second bias adjustment signal bus 202 and the second bias adjustment signal lines 220 are located in different film layers.

Since there are many lines with different functions in the display panel, in some cases, the bias adjustment signal bus may need to cross other line, e.g., a reset signal bus or an initialization signal bus which also locate in the side frame area, to connect to the bias adjustment signal lines, then it may be necessary to set the transition lines, through which the bias adjustment signal bus is connected to the bias adjustment signal lines. In addition, as in the display panel, the lines with different functions may be located in the same layer, for example, in some cases, the reset signal bus, the initialization signal bus, and the bias adjustment signal bus may be located in the same layer, in order to cross some lines by means of the transition traces, it may be necessary to arrange the transition lines in a film layer different from at least one of the bias adjustment signal bus line and the bias adjustment signal lines, so as to realize the electrical connection among them.

Optionally, in this embodiment, in some implementations, as shown in FIG. 1, the first bias adjustment signal bus 201 and the second bias adjustment signal bus 202 are extended in a same direction, and the first bias adjustment signal lines 210 and the second bias adjustment signal lines 220 are extended in a same direction.

In some cases, as shown in FIG. 1, both the first display area 101 and the second display area 102 are arranged adjacent to the first side frame 401 or the second side frame 402, so that the first bias adjustment signal bus 201 and the second bias adjustment signal bus 202 may be extended in a same direction, and the first bias adjustment signal lines 210 and the second bias adjustment signal lines 220 may be extended in a same direction. Thereby, the connection may be realized, and the structure is simple and easy to be implemented.

Figure 7:
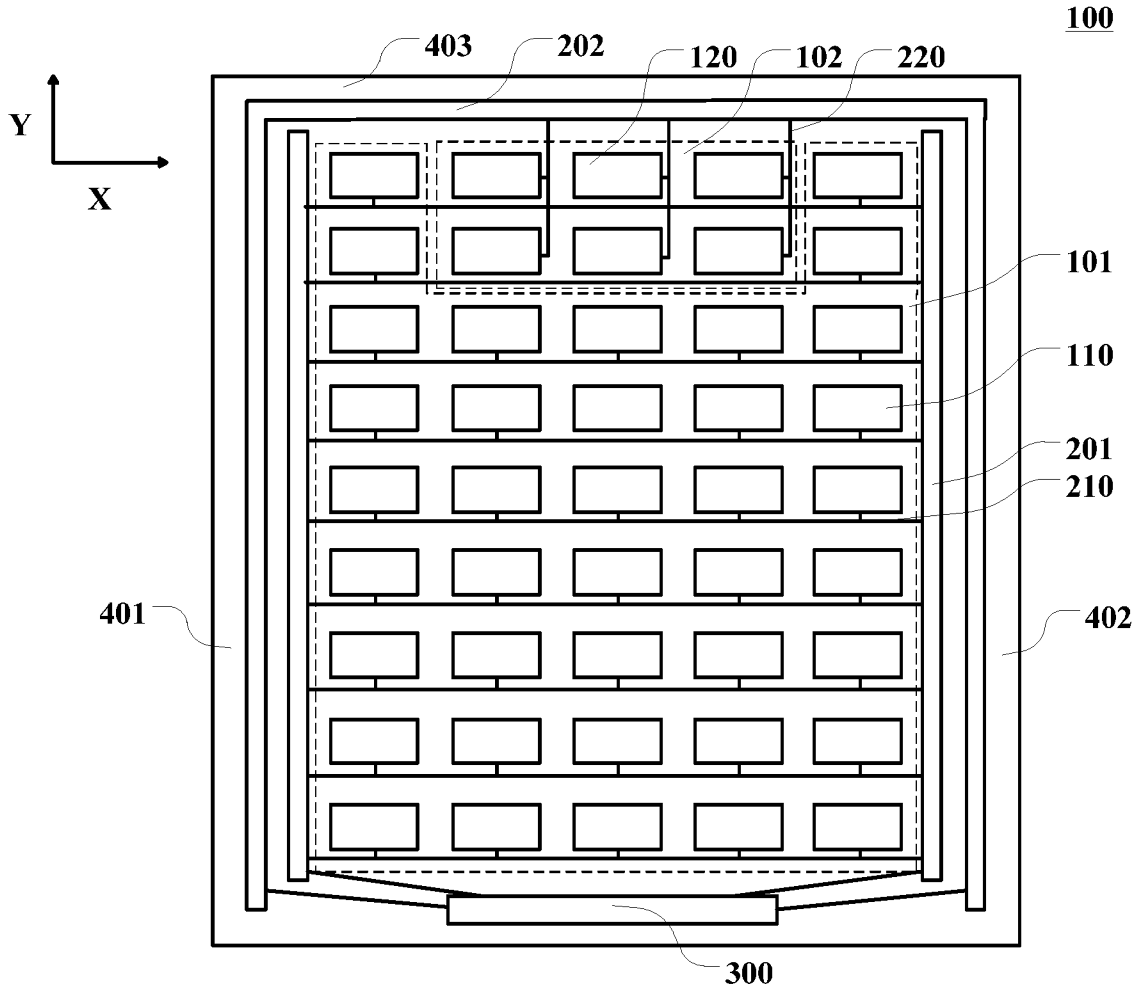
FIG. 7 is a schematic diagram of another display panel provided by an embodiment of the present application.

Optionally, referring to FIG. 7, FIG. 7 is a schematic diagram of another display panel provided by an embodiment of the present application, wherein the first bias adjustment signal bus 201 is located in at least one of the first side frame 401 and the second side frame 402 of the display panel; the second bias adjustment signal bus 202 is located at least in the first side frame 401 and a third side frame 403 of the display panel, and the third side frame 403 is arranged adjacent to the first side frame 401. The first bias adjustment signal lines 210 are extended along a first direction X and then connected to the first bias adjustment signal bus 201, and the second bias adjustment signal lines 220 are extended along a second direction Y and then connected to the second bias adjustment signal bus 202. The first direction X intersects with the second direction Y.

In some cases, the second display area 102 occupies only a small part of the display area, the first display area 101 is adjacent to the first side frame 401 and the second side frame 402, but the second display area 102 is not adjacent to at least one of the first side frame 401 or the second side frame 402. In this case, the second bias adjustment signal bus 202 may be arranged in the third side frame 403, the second bias adjustment signal lines 220 are connected to the second bias adjustment signal bus 202 along the second direction Y, and the first bias adjustment signal line 210 are connected to the first bias adjustment signal bus 201 along the first direction X, so that the problems of line concentration, the need of crossing lines or the like for the two signal buses may avoid, and the process is simplified.

Optionally, in this embodiment, a width of each of the first bias adjustment signal lines 210 is W11, and a width of each of the second bias adjustment signal lines 220 is W22. In some implementations, it may be that W1=W2. In other implementations, it may also be that W1≠W2, as the number of light emitting elements connected to a first bias adjustment signal line 210 is generally different from the number of light emitting elements connected to a second bias adjustment signal line 220. Therefore, a length of a first bias adjustment signal line 210 and a load carried thereon are different from a length of a second bias adjustment signal line 220 and a load carried thereon, and then W1≠W2 is set. It is advantageous to independently adjust the respective transmission processes for the first bias adjustment signal and the second bias adjustment signal.

Generally, as shown in FIG. 7, when the second display area 102 includes a transmission area, the transmission area is generally used for installing a camera for a display device, and the area of the second display area 102 generally does not need to be too large, that is, the area of the first display area 101 is larger than that of the second display area 102. In the second display area 102, the number of light emitting elements driven by the second pixel circuits 120 is smaller, and the number of light emitting elements loaded on a second bias adjustment signal line 220 is generally smaller, and thus W1>W2 is set. Thereby, a width of a bias adjustment signal line loaded with more light emitting elements is larger than a width of a bias adjustment signal line loaded with smaller light emitting elements. The larger the line width, the smaller the resistance is, and thus the load on the bias adjustment signal line with more light emitting elements is reduced. Of course, in other situations, W1<W2 may also be set, and this may be set according to specific situations.

Optionally, in this embodiment, a width of the first bias adjustment signal bus 201 is W11, and a width of the second bias adjustment signal bus 202 is W22. In some implementations, it may be that W11=W22. In other implementations, it may also be that W11≠W22, as the positions of the first display area 101 and the second display area 102 are generally different. Thereby, the length of the first bias adjustment signal bus 201 may also be different from the length of the second bias adjustment signal bus 202, and then the two bias adjustment signal buses need to be designed differentially to balance the loads and resistances thereon. In some cases, W11>W22, for example, when the number of light emitting elements loaded on the first bias adjustment signal bus 201 is larger, in order to reduce the load on the first bias adjustment signal bus 201, its width is set to be wider to reduce the resistance and balance the load. In other cases, W11<W22 may also be set, for example, as shown in FIG. 7, when the second bias adjustment signal bus 202 is wound to the third side frame 403, resulting in a longer length and an increased resistance, it needs to be set to be wider to reduce the resistance and balance the load on it. This may be set according to the specific situation.

Figure 8:
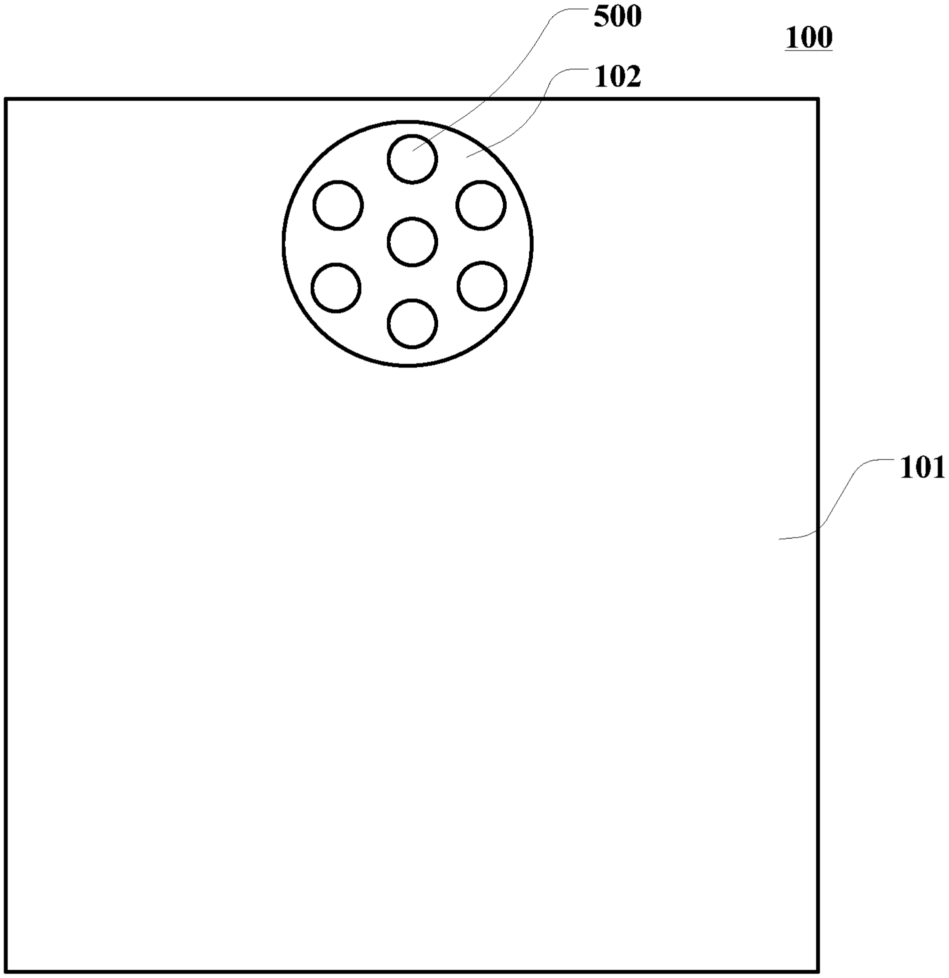
FIG. 8 is a schematic diagram of yet another display panel provided by an embodiment of the present application.

Referring to FIG. 8, FIG. 8 is a schematic diagram of yet another display panel provided by an embodiment of the present application. Optionally, in this embodiment, the second display area 102 includes a transmission area 500, and an operating process of the second display area 102 includes a light transmission stage, and at least in the light transmission stage, the transmission area 500 allows light to pass through the display panel.

Currently, the under-screen camera technology is one of the hottest technologies in the display industry. By installing the camera apparatus under the second display area 102 of the display panel, and providing the transmission area 500 in the second display area 102, when the camera function needs to be turned on, the camera obtains external light through the transmission area 500, and when the camera function is turned off, the second display area 102 may display normally, thereby realizing full-screen display.

In this embodiment, the first display area 101 is a normal display area without a transmission area, and the second display area 102 is a camera area under the screen, in which a transmission area 500 is provided. Since the transmission area 500 needs to occupy a certain area, among the first display area 101 and the second display area 102, the settings of the distribution density of the light emitting element, the magnitude of the light emitting area, the number of light emitting elements driven by the pixel circuit, and the magnitude of the width-to-length ratio of the driving transistor in the pixel circuit are all different, which may result in the definitions in the various embodiments described above. Of course, in other embodiments, for example, the definitions of the various embodiments described above may also be appropriate, when the display functions of the first display area 101 and the second display area 102 are different in other aspects.

Optionally, in this embodiment, in at least one operation stage of the display panel 100, the data refresh frequency in the first display area 101 is F1, and the data refresh frequency in the second display area 102 is F2, wherein F1≠F2.

As the user's functional requirements for the display panel are getting higher and higher, in some cases, different areas in the panel may need to be refreshed at different frequencies. For example, some pages may be used for game operations or video playback, etc., and high-frequency refreshes are required; some pages may display static images for a long time, or display for some text reading functions, and the refresh may be at a low frequency, thereby fully saving the power consumption of the panel, and in this case, F1≠F2. When F1≠F2, V1≠V2 may be set, because when the display panel refreshes data at a higher frequency, the frequency at which the driving transistor receives the data signal is higher, and the voltages among its gate, source and drain keep changing; or when the display panel refreshes data at a lower frequency, the frequency at which the driving transistor receives the data signal is lower, and the voltages among its gate, source and drain may maintain in one state for a long time. Since the bias problem of the driving transistor is mainly caused by the reverse electric field that may be appeared among the gate, source and drain of the driving transistor during the light emitting stage, different data refresh frequencies may cause the bias degree of the driving transistor to be changed. For areas with different data refresh frequencies, different bias adjustment signals are required for specific adjustment.

Further optionally, in this embodiment, as described above, when the display panel refreshes data at a higher frequency, the frequency at which the driving transistor receives the data signal is higher, and the voltages among its gate, source and drain of the driving transistor keep changing; or when the display panel refreshes data at a lower frequency, the frequency at which the driving transistor receives the data signal is lower, and the voltages among its gate, source, and drain may remain in one state for a long time. Therefore, when the display panel is refreshed at a lower frequency, the bias degree may be more serious. In order to eliminate the bias phenomenon as much as possible, a larger bias adjustment signal is required for adjustment. Therefore, when F1>F2, V1<V2, in this way, the respective bias states of the higher refresh frequency area and the lower refresh frequency area may be adjusted in a specific manner. In addition, in some special cases, there are other affect factors, resulting in that only F1>F2 and V1>V2 may meet the requirements. These may be adjusted flexibly according to the specific situation.

Optionally, in this embodiment, in at least one operation stage of the display panel 100, the light emitting elements in the first display area 101 operate in a first mode, and the light emitting elements in the second display area 102 operate in a second mode. A light emitting brightness of a light emitting element in the first mode is greater than a light emitting brightness of a light emitting element in the second mode.

Users may have different display brightness requirements for different areas of the display panel. For example, the display brightness of the text reading area generally does not need to be high to meet the requirements, while the display brightness of the video playback area often needs to be high, to display clearly. Therefore, this embodiment provides a display panel with different areas of different light emitting brightness. Based on this, since the light emitting brightness of a light emitting element in the first display area 101 is different from the emitting brightness of a light emitting element in the second display area 102, and the light emitting brightness is often related to the magnitude of the driving current generated by the driving transistor and the light emitting duration of the light emitting element within a frame, and the factors such as the magnitude of the driving current and light emitting duration are factors which affect the bias degree of the driving transistor, in this embodiment, for the first display area 101 and the second display area 102, different bias adjustment signals are provided to adjust the two areas differentially, that is, V1≠V2.

Further optionally, V1>V2, since the light emitting brightness of the first display area 101 is greater than the light emitting brightness of the second display area 102, in some cases, the light emitting duration of the light emitting element in the first display area 101 within one frame is greater than the light emitting duration of the light emitting element the second display area 102 within one frame. A as described above, the longer the light emitting duration of the light emitting element within one frame, the more serious the bias may be. Therefore, in this case, the bias adjustment signal received by the display area with higher light emitting brightness is larger, and the bias adjustment signal received by the display area with smaller light emitting brightness is smaller, so that the area with more serious bias problem and the area with relatively mild bias problem will be well adjusted, respectively.

In addition, generally, when the data signal is larger, the driving current may be smaller; and when the data signal is smaller, the driving current may be larger. When the change of the light emitting brightness is realized by changing the data signal, for a NMOS type driving transistor, the smaller the data signal received by the gate, the more likely the bias problem will be occurred in the light emitting stage. Therefore, for the area with higher light emitting brightness, it is also necessary to provide a larger bias signal for adjustment.

In some cases, optionally, it may also be that V1<V2. As described above, for a PMOS-type driving transistor, when the data signal received by its gate is larger, the bias problem is more likely to be occurred in the light emitting stage. Therefore, for an area with a smaller light emitting brightness, it is necessary to provide a larger bias signal for adjustment.

The above several schemes may be flexibly selected and adjusted according to the specific display situation and the brightness change manner.

Another aspect of the present application provides an integrated chip for providing the bias adjustment signal to the display panel according to any one of the above implementations. As shown in FIG. 1, the integrated chip 300 provides the first bias adjustment signal to the first pixel circuits 110 to adjust the bias states of the first pixel circuits 110, and the integrated chip 300 provides the second bias adjustment signal to the second pixel circuits 120 to adjust the bias states of the second pixel circuits 120. The voltage value of the first bias adjustment signal is V1, and the voltage value of the second bias adjustment signal is V2, wherein V1≠V2.

In this application, since two independent bias adjustment signals are required, and they are respectively transmitted to the display areas through the first bias adjustment signal bus 201 and the second bias adjustment signal bus 202, two different output ports are set on the integrated chip, one of the output ports is used for outputting the first bias adjustment signal, and the other output port is used for outputting the second bias adjustment signal. In this way, the signal transmission requirements in any of the foregoing implementations are met.

Yet another aspect of the present application provides a display apparatus, which includes the display panel according to any one of the foregoing implementations.

Figure 9:
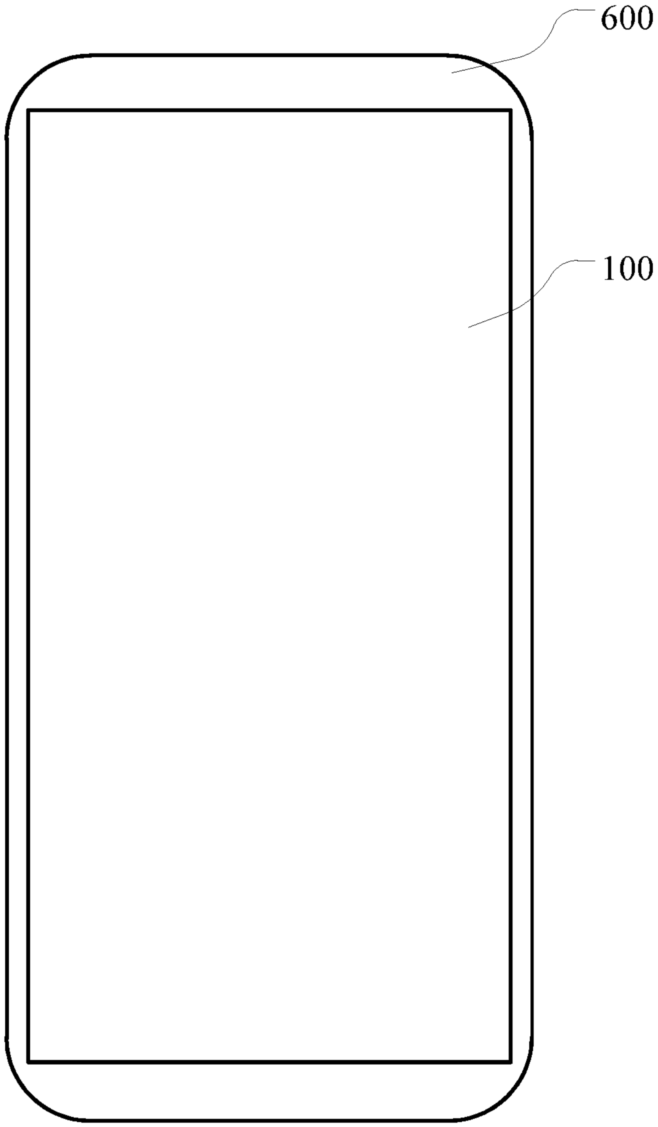
FIG. 9 is a schematic diagram of a display apparatus provided by an embodiment of the present application.

Referring to FIG. 9, FIG. 9 is a schematic diagram of a display apparatus provided by an embodiment of the present application, wherein the display apparatus 600 includes a display panel 100 according to any one of the foregoing e implementations, and the display apparatus may be a mobile phone, a televisions, a notebook computer, a tablet display device, a smart wearable display apparatus, etc., which is not specifically limited in this application.

Optionally, when the display apparatus provided in the present application is an under-screen camera display apparatus, the second display area 102 includes a transmission area 500, an operating process of the second display area 102 includes a light transmission stage, and at least in the light transmission stage, the transmission area 500 allows light to pass through the display pane. The display apparatus 600 includes a functional apparatus arranged correspondingly to the transmission area 500 of the second display area 102, and in the light transmission stage, the functional apparatus is able to transmit and receive light through the transmission area. Optionally, the functional apparatus is a camera. As described above, by arranging the camera below the transmission area of the display area, a full-screen function may be realized.

Through the above description, in the display panel, integrated chip and display apparatus provided by the present application, the display panel 100 includes a first display area 101 and a second display area 102, the first pixel circuits 110 for providing driving currents to the light emitting elements in the first display area 101 receive the first bias adjustment signal, the second pixel circuits 102 for providing driving currents to the light emitting elements in the second display area 102 receive the second bias adjustment signal, and the voltage value of the first bias adjustment signal is different from the voltage value of the second bias adjustment signal. Since, among the first display area 101 and the second display area 102, the factors of the width-to-length ratio of the driving transistor of the pixel circuit, the number of light emitting elements driven by the pixel circuit, the distribution density of the light emitting elements, the driving current and the light emitting area of the light emitting element, the data refresh frequency of the pixel circuit and the light emitting brightness of the light emitting element and other factors may be different, the bias states of the pixel circuits in the first display area 101 and the second display area 102 are different. Therefore, in this application, the bias adjustment signals received by the first display area 101 and the second display area 102 are set to be different, to specifically adjust the respective bias states of the first display area 101 and the second display area 102. Thus, the respective display functions of the first display area 101 and the second display area 102 is enabled, while good display effects are achieved.

The above content is a further detailed description of the present application in conjunction with specific preferred embodiments, and it cannot be considered that the specific implementations of the present application are limited to these descriptions. For those ordinary skilled in the technical field of the present application, some simple deductions or substitutions may be made without departing from the concept of the present application, which should be regarded as falling within the protection scope of the present application.

What is claimed is:

1. A display panel, comprising:

a first display area and a second display area; and pixel circuits comprising first pixel circuits and second pixel circuits, wherein the first pixel circuits are configured to provide driving currents to light emitting elements of the first display area, and the second pixel circuits are configured to provide driving currents to light emitting elements of the second display area, wherein the pixel circuits receive a bias adjustment signal, the bias adjustment signal comprises a first bias adjustment signal and a second bias adjustment signal, and the first pixel circuits receive the first bias adjustment signal to adjust bias states of the first pixel circuits, and the second pixel circuits receive the second bias adjustment signal to adjust bias states of the second pixel circuits, and wherein a voltage value of the first bias adjustment signal is V1, and a voltage value of the second bias adjustment signal is V2, and wherein V1≠V2, wherein the display panel comprises first bias adjustment signal lines and a first bias adjustment signal bus, and second bias adjustment signal lines and a second bias adjustment signal bus; and the first bias adjustment signal lines are connected between the first pixel circuits and the first bias adjustment signal bus, and the second bias adjustment signal lines are connected between the second pixel circuits and the second bias adjustment signal bus; and the first bias adjustment signal bus is located in at least one of a first side frame and a second side frame of the display panel that are arranged opposite to each other, and/or the second bias adjustment signal bus is located in at least one of the first side frame and the second side frame of the display panel that are arranged opposite to each other; and wherein the first bias adjustment signal bus and the first bias adjustment signal lines are connected by transition lines, and the transition lines and at least one of the first bias adjustment signal bus and the first bias adjustment signal lines are located in different film layers; and/or the second bias adjustment signal bus and the second bias adjustment signal lines are connected by second transition lines, and the second transition lines and at least one of the second bias adjustment signal bus and the second bias adjustment signal lines are located in different film layers.

2. The display panel according to claim 1, wherein each of the pixel circuits comprises a data writing module, a driving module, a compensation module and a bias adjustment module;

the driving module comprises a driving transistor configured to provide a driving current to a light emitting element of the display panel;

the data writing module is connected to a first electrode of the driving transistor, and is configured to provide a data signal to the driving transistor;

the bias adjustment module is connected to the first electrode or a second electrode of the driving transistor, and is configured to provide the bias adjustment signal to the driving transistor; and the compensation module is connected between a gate and the second electrode of the driving transistor, and is configured to compensate a threshold voltage of the driving transistor.

3. The display panel according to claim 1, wherein an operating process of each of the pixel circuits comprises a data writing frame and a holding frame, the data writing frame comprises a first bias adjustment stage, and in the first bias adjustment stage, the voltage value of the first bias adjustment signal is V11, and the voltage value of the second bias adjustment signal is V12, and wherein V11≠V12.

4. The display panel according to claim 1, wherein an operating process of each of the pixel circuits comprises a data writing frame and a holding frame, the holding frame comprises a second bias adjustment stage, and in the second bias adjustment stage, the voltage value of the first bias adjustment signal is V21, the voltage value of the second bias adjustment signal is V22, and wherein V21≠V22.

5. The display panel according to claim 1, wherein an operating process of each of the pixel circuits comprises a data writing frame and a holding frame; the data writing frame comprises a first bias adjustment stage, and the holding frame comprises a second bias adjustment stage; in the first bias adjustment stage, the voltage value of the first bias adjustment signal is V11, and the voltage value of the second bias adjustment signal is V12; and in the second bias adjustment stage, the voltage value of the first bias adjustment signal is V21, and the voltage value of the second bias adjustment signal is V22, and wherein $|V11-V12|+|V21-V22|\neq 0$.

6. The display panel according to claim 5, wherein

V11≠V12, V21=V22; or

V11=V12, V21≠V22.

7. The display panel according to claim 5, wherein $|V11-V12|=|V21-V22|$.

8. The display panel according to claim 5, wherein $|V11-V12|>|V21-V22|$, or $|V11-V12|<|V21-V22|$.

9. The display panel according to claim 5, wherein $(V11-V12)\times(V21-V22)>0$.

10. The display panel according to claim 5, wherein $(V11-V12)\times(V21-V22)<0$.

11. The display panel according to claim 1, wherein the first bias adjustment signal bus and the second bias adjustment signal bus are located in a same film layer, and the first bias adjustment signal lines and the second bias adjustment signal lines are located in different film layers;

the first bias adjustment signal bus and the second bias adjustment signal bus are located in different film layers, and the first bias adjustment signal lines and the second bias adjustment signal lines are located in a same film layer; or the first bias adjustment signal bus and the second bias adjustment signal bus are located in a same film layer, and the first bias adjustment signal lines and the second bias adjustment signal lines are located in a same film layer.

12. The display panel according to claim 1, wherein the first bias adjustment signal bus and the second bias adjustment signal bus are extended in a same direction, and the first bias adjustment signal lines and the second bias adjustment signal lines are extended in a same direction.

13. The display panel according to claim 11, wherein the first bias adjustment signal bus is located in at least one of the first side frame and the second side frame of the display panel;

the second bias adjustment signal bus is located at least in the first side frame and a third side frame of the display panel, and the third side frame is arranged adjacent to the first side frame, and wherein the first bias adjustment signal lines are extended along a first direction and then connected to the first bias adjustment signal bus, and the second bias adjustment signal lines are extended along a second direction and then connected to the second bias adjustment signal bus; and the first direction intersects with the second direction.

14. The display panel according to claim 1, wherein a width of each of the first bias adjustment signal lines is W1, and a width of each of the second bias adjustment signal lines is W2, and wherein W1≠W2; and/or a width of the first bias adjustment signal bus is W11, and a width of the second bias adjustment signal bus is W22, and wherein W11≠W22.

15. The display panel according to claim 1, wherein the second display area comprises a transmission area, an operating process of the second display area comprises a light transmission stage, and at least in the light transmission stage, the transmission area allows light to pass through the display panel.

16. The display panel according to claim 1, wherein in at least one operating stage of the display panel, a data refresh frequency in the first display area is F1, and a data refresh frequency in the second display area is F2, and wherein F1≠F2.

17. An integrated chip for providing the bias adjustment signal to the display panel according to claim 1, wherein the integrated chip provides the first bias adjustment signal to the first pixel circuits to adjust the bias states of the first pixel circuits, and the integrated chip provides the second bias adjustment signal to the second pixel circuits to adjust the bias states of the second pixel circuits, and wherein the voltage value of the first bias adjustment signal is V1, and the voltage value of the second bias adjustment signal is V2, and wherein V1≠V2.

18. A display apparatus comprising a display panel, wherein the display panel comprises:

a first display area and a second display area; and pixel circuits comprising first pixel circuits and second pixel circuits, wherein the first pixel circuits are configured to provide driving currents to light emitting elements of the first display area, and the second pixel circuits are configured to provide driving currents to light emitting elements of the second display area, wherein the pixel circuits receive a bias adjustment signal, the bias adjustment signal comprises a first bias adjustment signal and a second bias adjustment signal, and the first pixel circuits receive the first bias adjustment signal to adjust bias states of the first pixel circuits, and the second pixel circuits receive the second bias adjustment signal to adjust bias states of the second pixel circuits, and wherein a voltage value of the first bias adjustment signal is V1, and a voltage value of the second bias adjustment signal is V2, and wherein V1≠V2.

* * * * *